(12) United States Patent
Ferenc et al.

(10) Patent No.: US 11,548,413 B2
(45) Date of Patent: Jan. 10, 2023

(54) REINFORCEMENT BRACKET WITH INTEGRATED END STOP

(71) Applicant: Brose Fahrzeugteile SE & Co. Kommanditgesellschaft, Coburg, Coburg (DE)

(72) Inventors: Anthony Ferenc, Goodrich, MI (US); Dakota Stapleton, Flushing, MI (US)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 17/154,491

(22) Filed: Jan. 21, 2021

(65) Prior Publication Data
US 2022/0227261 A1  Jul. 21, 2022

(51) Int. Cl.
*B60N 2/07* (2006.01)

(52) U.S. Cl.
CPC ......... *B60N 2/0732* (2013.01); *B60N 2/0727* (2013.01)

(58) Field of Classification Search
CPC ... B60N 2/0818; B60N 2/0727; B60N 2/0732
USPC ...................................... 297/344.1
See application file for complete search history.

(56) References Cited

U.S. PATENT DOCUMENTS

| | | | | |
|---|---|---|---|---|
| 9,902,294 B2* | 2/2018 | Mischer | ............... | B60N 2/0715 |
| 10,919,415 B2* | 2/2021 | Emrich | ............... | B60N 2/0705 |
| 11,065,986 B2* | 7/2021 | Emrich | .................... | B60N 2/43 |
| 11,230,208 B2* | 1/2022 | Flick | ....................... | B60N 2/08 |
| 2010/0207419 A1* | 8/2010 | Kojima | ............... | B60N 2/0727 |
| | | | | 296/65.13 |
| 2019/0126875 A1* | 5/2019 | Watanabe | ......... | B60R 21/01554 |

* cited by examiner

*Primary Examiner* — Sarah B McPartlin
(74) *Attorney, Agent, or Firm* — Brooks Kushman, P.C.

(57) ABSTRACT

A vehicle seat including a fixed rail assembly, a translatable rail, and a translatable bracket. The fixed rail assembly includes a fixed rail and a fixed bracket extending from the fixed rail assembly. The translatable rail is configured to translate in a longitudinal direction along the fixed rail. The translatable bracket is fixed relative to the translatable rail such that the translatable rail and the translatable bracket translate in unison. The translatable bracket is configured to retain portions of the translatable rail within portions of the fixed rail. The translatable bracket includes a translating stop. The translatable rail is configured to translate between a first position in which the translating stop engages a fixed stop and a second position in which the translating stop is spaced apart from the translating stop.

15 Claims, 5 Drawing Sheets

REINFORCEMENT BRACKET WITH INTEGRATED END STOP

TECHNICAL FIELD

The present disclosure relates to a motor vehicle seat.

BACKGROUND

Vehicle seats may include a fixed rail and a translatable rail that translates along the fixed rail to move the vehicle seat in a longitudinal direction. Portions of the translatable rail may be nested within the fixed rail so that during a crash event the translatable rail is retained within the fixed rail. Vehicle seats may also include a number of stops so that the translatable rail is stopped as the translatable rail moves between a first position and a second position.

SUMMARY

According to one embodiment, a motor vehicle seat is provided. The motor vehicle seat may include a fixed rail assembly, a translatable rail, and a translatable bracket. The fixed rail assembly may include a fixed rail and a fixed bracket that may extend from the fixed rail assembly. The translatable rail may be configured to translate in a longitudinal direction along the fixed rail. The translatable bracket may be fixed relative to the translatable rail such that the translatable rail and the translatable bracket translate in unison. The translatable bracket may be configured to retain portions of the translatable rail within portions of the fixed rail. The translatable bracket may include a translating stop. The translatable rail may be configured to translate between a first position in which the translating stop engages a fixed stop and a second position in which the translating stop is spaced apart from the translating stop.

According to another embodiment, a motor vehicle seat is provided. The motor vehicle seat may include a cushion carrier, a fixed rail assembly, a translatable rail assembly, a fixed bracket, and a translatable bracket. The cushion carrier may be configured to support a seated occupant. The fixed rail assembly may include a fixed rail. The translatable rail assembly may include a translatable rail that may be configured to translate in a longitudinal direction along the fixed rail. The translatable bracket may be fixed to the cushion carrier and/or the translatable rail assembly. The translatable bracket may include a translating stop and may be configured to retain portions of the translatable rail within the fixed rail. The translatable rail may be configured to translate between a first position in which the translating stop engages a fixed stop, and a second position in which the translating stop is spaced from the fixed stop.

According to yet another embodiment, a rail assembly for use in a motor vehicle seat is provided. The rail assembly may include a fixed rail, a translatable rail, a fixed bracket that may include a fixed stop, and a translatable bracket. The translatable rail may be configured to translate in a longitudinal direction along the fixed rail. The translatable bracket may be fixed relative to the translatable rail such that the translatable bracket and translatable rail translate in unison. The translatable bracket may also be configured to retain portions of the translatable rail within the fixed rail. The translatable rail may be configured to translate between a first position in which the translating stop engages a fixed stop, and a second position in which the translating stop is spaced from the fixed stop.

DETAILED DESCRIPTION

Figure 1:
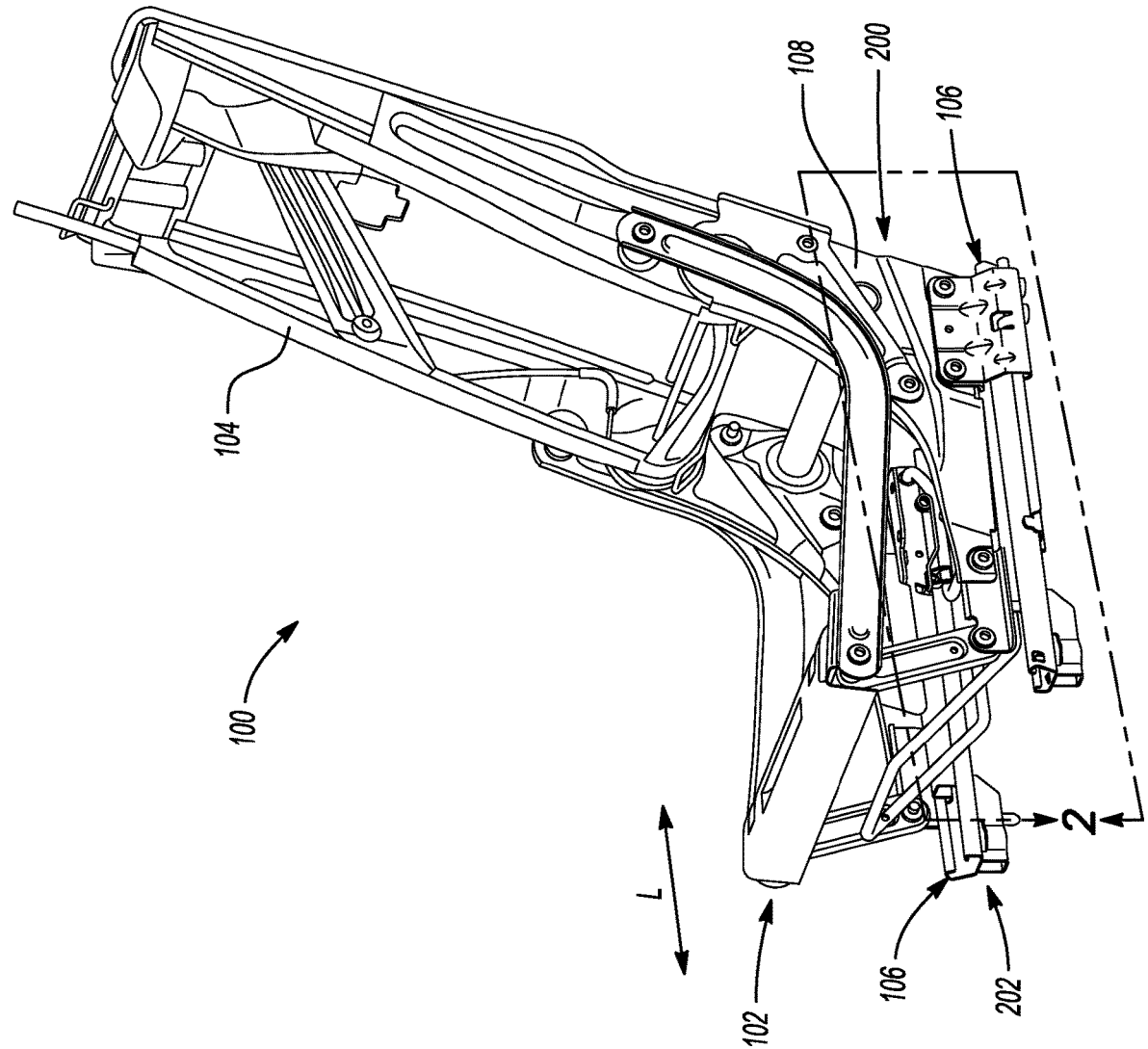
FIG. 1 illustrates a perspective view of an exemplary motor vehicle seat.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring generally to the figures, a vehicle seat 100 is provided. The vehicle seat 100 may include a cushion carrier 102, a backrest 104, and a rail assembly 106. The cushion carrier 102 may be configured to support a seated occupant and the backrest 104 may be configured to support the seated occupant's back. The cushion carrier may include one or more side members 108 that may be coupled to the rail assembly 106. The rail assembly 106 may include a fixed rail assembly 110 that may be fixed relative to a vehicle floor 126 and the translatable rail assembly 112 that may translate with respect to the fixed rail assembly 110. The fixed rail assembly 110 may include a fixed rail 114 and the translatable rail assembly 112 may include in a translatable rail 116.

The vehicle seat 100 may include a set of coupling or catcher brackets. For example, a fixed bracket 118 and a translatable bracket 120. The fixed bracket 118 and the translatable bracket 120 may be configured to cooperatively engage as a force is applied to the translatable rail. As an example, during a front crash even, a force F may be applied to the translatable rail. The translatable bracket 120 may include a translatable stop 122 that may engage a fixed stop 124 when the translatable rail is in either a first position or a second position. In one or more embodiments, the translatable stop 122 may be integrally formed to the translatable bracket 120.

Integrating the translatable stop 122 into the translatable bracket 120 may eliminate producing and assembling an additional component to form the translatable stop. Additionally, integrating translatable stop 122 with the translating bracket 120 may allow for commonization or standardization of certain components. For example, a number of vehicles may share a common core design so that larger components e.g., rails, side members or other large stampings are each produced from a common set of tools, thus creating increased economies of scale. And one or more of the seats for a few of those vehicles may require unique components such as the translatable bracket and may have varying travel distance and in turn varying locations and forms of translatable stops. By combining the translatable stop 122 and the translatable bracket 120, seats that require such a bracket and stop may use the same rails and side members, for example, as seats that do not require such a bracket, stop, or both.

In one or more embodiments, the fixed stop 124 may be formed by the fixed bracket 118. As another example, the fixed stop may be formed by or fixed to a floor 126 of the vehicle. The fixed bracket 118 may include a first hook 127 and the translatable bracket 120 may include a second hook 128. In response to the force F, described above, the first hook 127 may engage the second hook 128 so that at least portions of the translatable rail 116 are retained in the fixed rail 114.

The translatable bracket 120 may include a leading end 130 and a trailing end 132 that may each be positioned with respect to the longitudinal direction L. The leading end 130 may refer to an end that passes by a fixed point before the trailing end 132. The translatable stop 122 may be disposed between the leading and trailing ends 130, 132 so that a portion overlaps or covers up at least portions of the fixed stop when the translatable stop is engaged with the fixed stop. The translatable stop 122 may extend in direction that is transverse to the longitudinal direction L and may overlap at least portions of the fixed bracket. According to one or more embodiments, the translatable bracket 120 may include a main body 134 and a tab 122 that may extend from the main body 134. The tab 122 may be disposed within an opening 138 that is defined by a portion of the main body 136.

Referring to FIG. 1, a perspective view of the vehicle seat 100 is illustrated. The vehicle seat 100 may be a second row or third row seat for use in a sport utility vehicle. As another example, the seat may be used in a first row. The seat 100 may be an all-belts-to-seat (ABTS) structure. This means the points of attachment of the seat belt (generally three points) are attached to the vehicle seat 100 instead of the vehicle body. Because an ABTS structure must withstand forces from the additional belt point attachments, the ABTS structure may require a reinforcement or coupling brackets to delay, prolong, or prevent the translatable rail 116 from disengaging from the fixed rail 114.

The vehicle seat 100 may include a cushion carrier 102 that may be disposed above and coupled to the rail assembly 106 and a backrest 104 that may be fixed to the cushion carrier 102. As an example, the side members 108 of the cushion carrier 102 may be fixed to the backrest 104. The vehicle seat may be adjusted, either electrically or manually, between a number of positions along the longitudinal direction L. The vehicle seat 100 may include an inboard side 200 and an outboard side 202. The inboard side 200 may refer to a portion of the vehicle seat 100 that is disposed further away from the exterior of the vehicle and the outboard side 202 may be disposed closer to the exterior of the vehicle than the inboard side 200. In one or more embodiments, the rail assemblies 106 of the inboard side 200 and the outboard side 202 may be mirrored with respect to one another. Reference to the rail assembly 106 in the present disclosure may refer to the inboard side 200, or the outboard side 202, or both.

Figure 2:
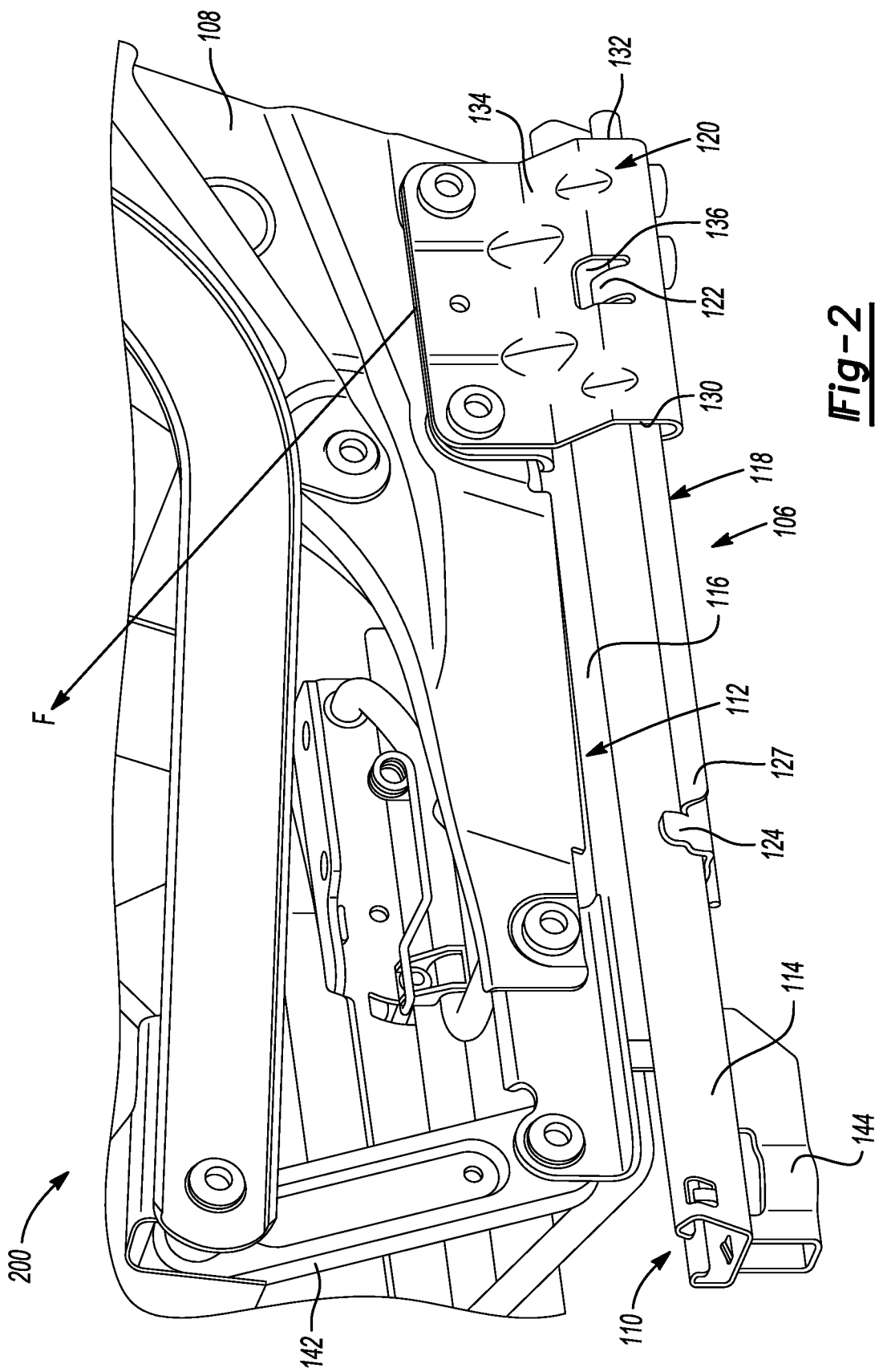
FIG. 2 illustrates a detailed-perspective view of a first side of the exemplary motor vehicle seat.
Figure 3:
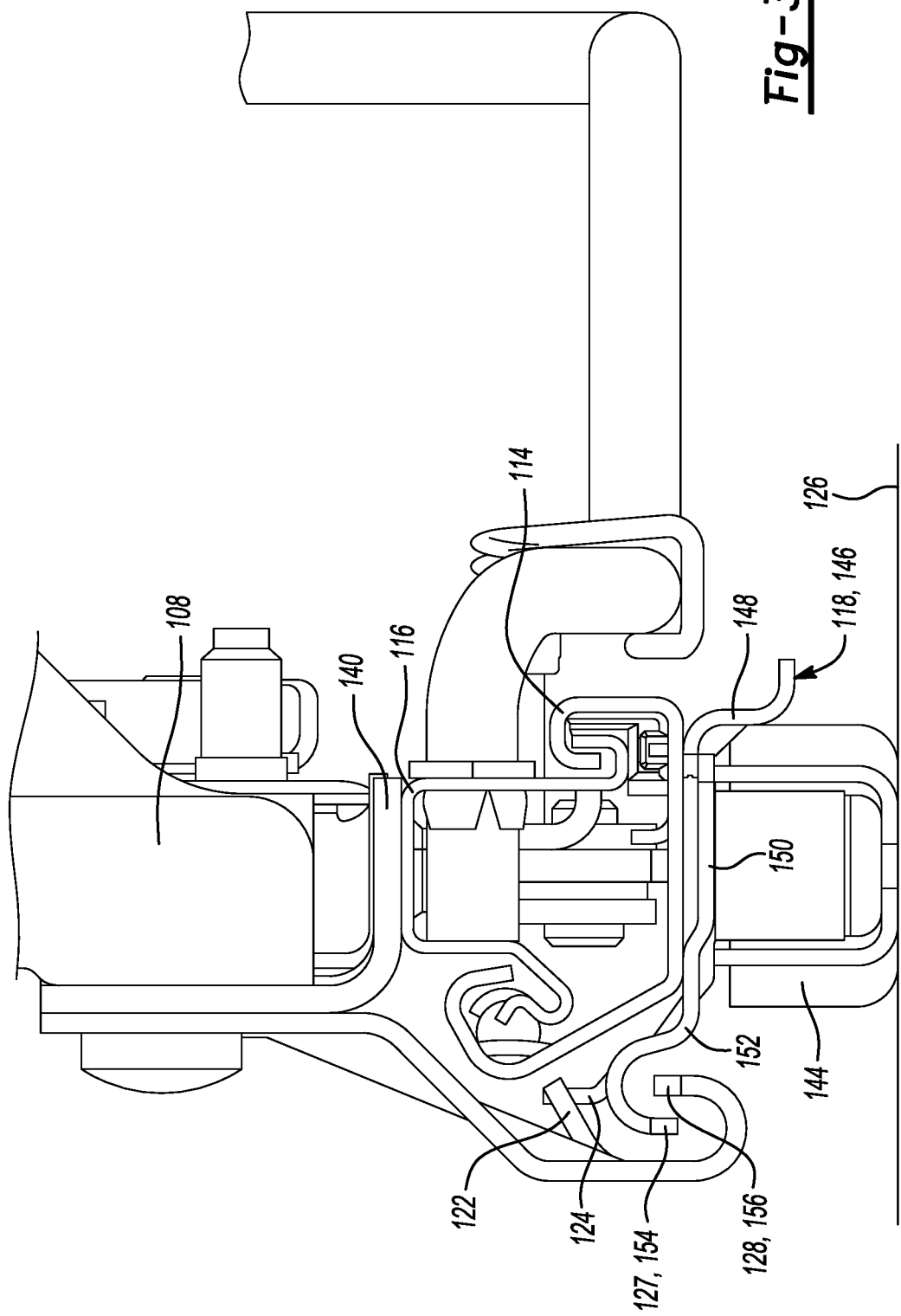
FIG. 3 illustrates a rear-plan view of a portion of the exemplary motor vehicle seat.

Referring to FIG. 2, a detailed-perspective view of a portion of the vehicle seat 100 is illustrated. More specifically, the rail assembly 106 and a portion of one of the side members 108 of the inboard side 200 is illustrated. As mentioned above, the rail assembly 106 may include the fixed rail assembly 110 and the translatable rail assembly 112. The fixed rail assembly 110 may include the fixed rail 114 that may receive portions of a translatable rail 116 of the translatable rail assembly 112. In one or more embodiments, the fixed rail 114 may be attached to a bracket such as a riser 144 that may fix the fixed rail 114 to the vehicle floor 126 (FIG. 3). In another embodiment, the fixed rail 114 may be directly fixed to the vehicle floor 126. The fixed rail assembly 110 may include the fixed bracket 118 that may be attached to at least a bottom portion of the fixed rail 114.

The fixed bracket 118 may include the first hook 127 that may extend along at least a portion of the fixed bracket 118. In one or more embodiments, the fixed bracket 118 may include the fixed stop 124. As an example, the fixed stop 124 may be a protrusion that may extend in a direction so that the fixed stop 124 engages the translatable stop 122 when the translatable rail 116 and translatable bracket 120 are in a predetermined position. As an example, the first hook 127 may extend from one end of the fixed bracket 118 and terminate at the fixed stop 124.

The translatable bracket 120 includes the main body 134 that includes a leading end 130 and a trailing end 132. The main body 134 may define the opening 138 and the translatable stop 122 may extend from an inner periphery of the opening 138 so that the translatable stop 122 engages the fixed stop 124 when the translatable bracket 120 is in a predetermined position. The opening 138 may be arranged with respect to the translatable stop 122 and the fixed stop 124 so that portions of the main body 134 cover the fixed stop 124 as the leading end 130 passes the fixed stop 124.

The translatable rail assembly 112 may include a number of coupling brackets 140 that may be fixed to the translatable rail assembly 112. The coupling brackets 140 may be connected to a pivot link 142 or another component such as the side member 108. In one or more embodiments, the translatable bracket 120 may be fixed to one or more of the coupling brackets 140 or the side member 108. The pivot link 142 may be coupled to the cushion carrier 102 (FIG. 1) so that the cushion carrier 102 may pivot towards and away from the rail assembly 106.

A directional arrow F indicates an exemplary force F that may be applied to the rail assembly 106 during a vehicle event such as a frontal impact. The force F may be applied in a vertical direction such as at a forty-five-degree angle with respect to the longitudinal direction L. As an example, the force F may range between 10 Kn and 25 Kn.

Referring to FIG. 3, a rear plan view of a portion of the vehicle seat 100 is illustrated. As illustrated, the riser 144 is disposed between the vehicle floor 126 and the fixed bracket 118. As an example, an inner portion 146 of the fixed bracket 118 may extend beyond an inner portion of the fixed rail 114, or the riser 144, or both. At least a portion of the inner portion 146, such as a vertical extending portion 148 of the fixed bracket 118 may extend towards the vehicle floor 126 and lie along an inner portion of the riser 144. The vertical extending portion 148 may counteract forces transferred from the first hook 127 by distributing those forces to the riser 144 and the vehicle floor 126. Although the riser 144 is illustrated here, other embodiments may not include a riser 144 and the fixed rail 114, or fixed bracket 118, or both may be attached directly to the vehicle floor 126.

In one or more embodiments, the fixed bracket 118 may include a medial portion 150 that may be sandwiched between the riser 144 and the fixed rail 114. The medial portion 150 may extend between the inner portion 146 and an outer portion 152. As an example, the medial portion 150 may be welded such as laser welded or MIG welded to a bottom portion of the fixed rail 114. As another example, the medial portion 150 may be riveted or clinched to the bottom portion of the fixed rail 114. The outer portion 152 of the fixed bracket 118 may include the first hook 127. The first hook 127 may include a distal end 154 that may extend towards the vehicle floor 126. The fixed stop 124 is disposed in front of the translatable stop 122 and may extend in a direction that is substantially parallel to a sidewall of the fixed rail 114.

The coupling bracket 140 may be fixed to the translatable rail 116 such as a top surface of the translatable rail 116 by welding or a number of fasteners. In one or more embodiments, the coupling bracket 140 may have an L-shape and be connected to the translatable rail 116 by a lap weld. As another example, the coupling bracket may be substantially planar and be connected to the translatable rail by a T-joint weld. An upper portion of the coupling bracket 140 may be attached to the side member 108, the translatable bracket 120, or both.

The main body 134 of the translatable bracket 120 may extend away from the side member 108 and the coupling bracket 140 towards the vehicle floor 126. As an example, the main body 134 may extend in a direction that is substantially parallel to the distal end 154 of the first hook 127. The translatable stop or tab 122 may extend towards the translatable rail 116 from the main body 134. As the translatable rail 116 translates along the longitudinal direction L, the main body 134 may be arranged to slide past or cover the fixed stop 124. The main body 134 may extend from the upper portion to the second hook 128. The second hook 128 may include a distal end 156 that may extend in a direction that may be substantially parallel to the distal end 154 of the first hook 127.

Figure 4:
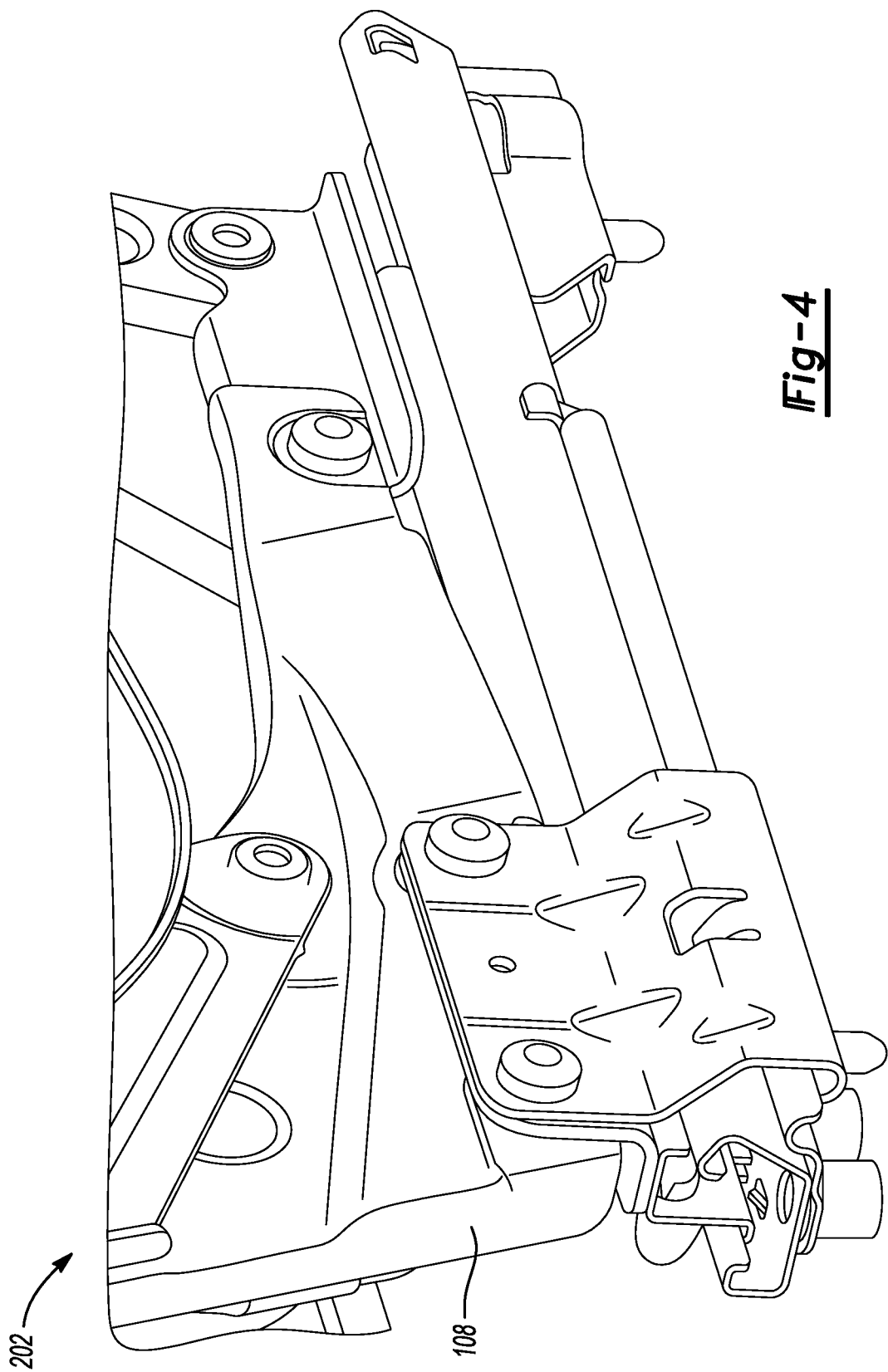
FIG. 4 illustrates a detailed-perspective view of a second side of the exemplary motor vehicle seat.

Referring to FIG. 4, a detailed-perspective view of a portion of the vehicle seat 100 is illustrated. More specifically, the rail assembly 106 and a portion of one of the side members 108 of the outboard side 202 is illustrated.

Figure 5:
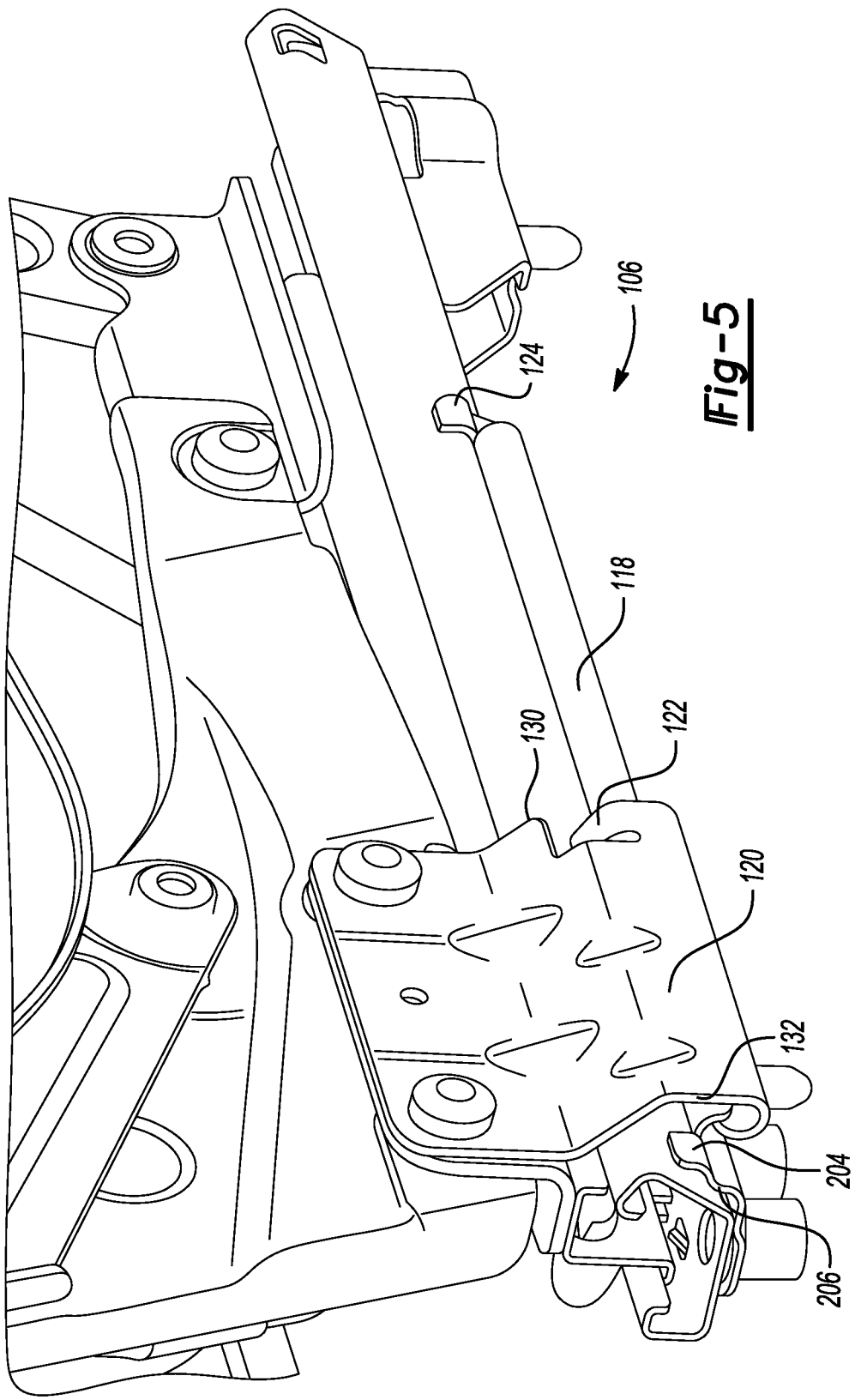
FIG. 5 illustrates a detailed-perspective view of a second side of another exemplary motor vehicle seat.

Referring to FIG. 5, a detailed-perspective view of a portion of the vehicle seat 100 according to one or more embodiments is illustrated. One or more portions of the embodiment shown in FIG. 5 may be applicable to the embodiments described above. The rail assembly 106 shown in FIG. 5 is positioned in a position disposed between a forward-most position and a rearward most position.

As an example, the fixed bracket 118 may include a second fixed stop 204. The second fixed stop 204 may be referred to as a rearward-most stop and may be disposed near or on a rear end 206 of the fixed bracket 118. The translatable stop 122 may engage or contact the second fixed stop 204 when the rail assembly 106 and seat 100 is in the rearward-most position. As another example, the translatable stop 122 may be disposed on or form a portion of the leading end 130 of the translatable bracket 120. Alternatively, the translatable stop 122 may be disposed on or form a portion of a trailing end 132 of the translatable bracket 120.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

L Longitudinal direction
100 vehicle seat
102 cushion carrier
104 backrest
106 rail assembly 108 side members
110 fixed rail assembly
112 translatable rail assembly
114 fixed rail
116 translatable rail
118 fixed bracket
120 translatable bracket
122 translatable stop
122 tab
124 fixed stop
126 vehicle floor
127 first hook
128 second hook
130 leading end
132 trailing end
134 main body
138 opening
140 coupling brackets
142 pivot link
144 riser
146 inner portion
148 vertical extending portion
150 medial portion
152 outer portion
154 distal end
200 inboard side
202 outboard side
204 second fixed stop
206 rear end of fixed bracket

What is claimed is:

1. A motor vehicle seat comprising:
a fixed rail assembly including a fixed rail and a fixed bracket extending from the fixed rail, the fixed bracket forming a fixed stop;
a translatable rail configured to translate in a longitudinal direction along the fixed rail; and
a translatable bracket fixed relative to the translatable rail such that the translatable rail and the translatable bracket translate in unison, the translatable bracket being configured to retain portions of the translatable rail within portions of the fixed rail, wherein the translatable bracket includes a translating stop;
wherein the translatable rail is configured to translate between a first position in which the translating stop engages the fixed stop, and a second position in which the translating stop is spaced from the fixed stop,
wherein the translatable bracket includes a leading end and a trailing end, each positioned with respect to the longitudinal direction, wherein the translating stop is disposed between the leading and trailing ends, such that a portion of the translatable bracket overlaps the fixed stop when the translatable stop is engaged with the fixed stop.

2. The motor vehicle seat of claim 1, wherein the fixed bracket includes a first hook and the translatable bracket includes a second hook, and wherein the first hook engages the second hook in response to a force exceeding a threshold is applied to the translatable rail in a direction oblique to the longitudinal direction.

3. The motor vehicle seat of claim 2, wherein the translating stop extends towards the translatable rail and overlaps the fixed bracket.

4. The motor vehicle seat of claim 2, wherein the fixed rail is attachable to a vehicle floor wherein the fixed stop extends away from the vehicle floor and the first hook includes a distal end that extends towards the vehicle floor.

5. The motor vehicle seat of claim 1, further comprising:
a cushion carrier; and
a coupling bracket fixed to the translatable rail and coupled to the cushion carrier, wherein the translatable bracket is directly fixed to the cushion carrier and/or the coupling bracket.

6. The motor vehicle seat of claim 1, wherein the translatable stop is a tab extending from a main body of the translatable bracket.

7. The motor vehicle seat of claim 1, wherein the fixed stop is a tab extending from a main body of the fixed bracket.

8. A motor vehicle seat comprising:
a cushion carrier;
a fixed rail assembly including a fixed rail;
a translatable rail assembly including a translatable rail configured to translate in a longitudinal direction along the fixed rail;
a fixed bracket; and
a translatable bracket fixed to the cushion carrier and/or the translatable rail assembly, the translatable bracket being configured to retain portions of the translatable rail within portions of the fixed rail, wherein translatable bracket includes a translating stop;
wherein the translatable rail is configured to translate between a first position in which the translating stop engages a fixed stop, and a second position in which the translating stop is spaced from the fixed stop,
wherein the translatable bracket includes a leading end and a trailing end, each positioned with respect to the longitudinal direction, wherein the translating stop is disposed between the leading and trailing ends, such that a portion of the translatable bracket overlaps the fixed stop when the translating stop is engaged with the fixed stop.

9. The motor vehicle seat of claim 8, wherein in an installed state, the fixed rail and the fixed bracket are each fixed to a vehicle floor.

10. The motor vehicle seat of claim 8, wherein the fixed bracket includes a fixed hook extending from a main body of the fixed bracket, wherein a main body of the translatable bracket is substantially parallel to an end portion of the fixed hook.

11. A rail assembly for use in a motor vehicle seat, the rail assembly comprising:
a fixed rail;
a translatable rail configured to translate in a longitudinal direction along the fixed rail;
a fixed bracket including a fixed stop, wherein the fixed bracket is directly connected to the fixed rail; and
a translatable bracket fixed relative to the translatable rail such that the translatable rail and the translatable bracket translate in unison, the translatable bracket being configured to retain portions of the translatable rail within portions of the fixed rail, wherein translatable bracket includes a translating stop;
wherein the translatable rail is configured to translate between a first position in which the translating stop engages a fixed stop, and a second position in which the translating stop is spaced from the fixed stop,
wherein the translatable bracket includes a first protrusion extending from a main body of the translatable bracket and portions of the main body of the translatable bracket cover the fixed stop when the translatable stop is spaced apart from the fixed stop by a first distance and the portions of the main body of the translatable bracket do not cover the fixed stop when the translatable stop is spaced apart from the fixed stop by a second distance, and wherein the second distance is greater than the first distance.

12. The rail assembly of claim 11, wherein the fixed bracket includes a rearward fixed stop and the translatable rail is configured to translate between a forward-most position and a rearward-most position in which the translating stop engages the rearward stop.

13. The rail assembly of claim 12, wherein the first position is the forward-most position and the second position is disposed between the forward-most position and the rearward-most position.

14. The rail assembly of claim 13, wherein the fixed bracket includes a rearward end and a forward end, and the rearward end includes the rearward stop.

15. The rail assembly of claim 14, wherein the translatable bracket includes a leading end and a trailing end, each positioned with respect to the longitudinal direction, wherein the translating stop forms a portion of the leading end.

\* \* \* \* \*